April 23, 1963 C. A. DAMM 3,086,809

UNIVERSAL HOISTING SLING

Filed Aug. 25, 1958 4 Sheets-Sheet 1

INVENTOR.
CARL A. DAMM

BY

J. M. Smith, Jr.
ATTORNEYS

April 23, 1963 C. A. DAMM 3,086,809

UNIVERSAL HOISTING SLING

Filed Aug. 25, 1958 4 Sheets-Sheet 2

INVENTOR.
CARL A. DAMM

BY

J. M. Smith Jr.
ATTORNEYS

UNIVERSAL HOISTING SLING

Filed Aug. 25, 1958

INVENTOR

April 23, 1963 C. A. DAMM 3,086,809

UNIVERSAL HOISTING SLING

Filed Aug. 25, 1958 4 Sheets-Sheet 4

INVENTOR.
CARL A. DAMM

BY

ATTORNEYS

United States Patent Office 3,086,809

Patented Apr. 23, 1963

3,086,809

UNIVERSAL HOISTING SLING

Carl A. Damm, Upper Black Eddy, Pa., assignor to the United States of America as represented by the Secretary of the Navy Filed Aug. 25, 1958, Ser. No. 757,163
16 Claims. (Cl. 294—75)
(Granted under Title 35, U.S. Code (1952), sec. 266)

Figures 1, 1A, 1B, 2:
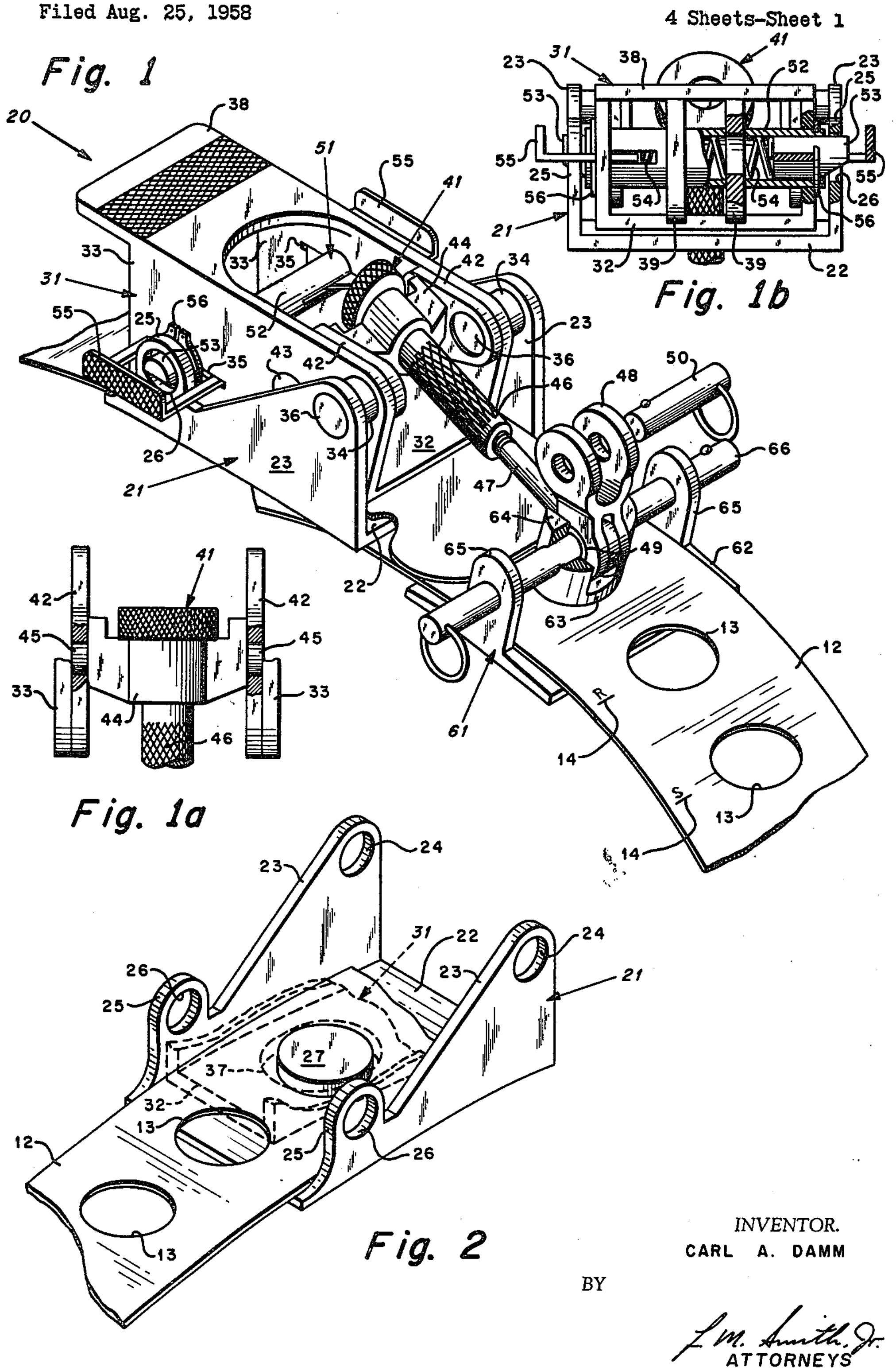

The invention described herein may be manufactured and used by or for the Government of the United States of America for governmental purposes without the payment of any royalties thereon or therefor.

The instant invention relates to a universal hoisting sling, and more particularly to a universal hoisting sling for lifting or securing smoothly contoured objects which is composed of a plurality of readily interfitted modular elements of minimized weight and overall dimensions suitable for rapid interconnection in various configurations to accommodate objects of various sizes, shapes, construction, and weight.

There are numerous existing means for encircling and supporting smoothly contoured objects such as cylindrical containers for the purpose of hoisting such objects. For example, there are various assemblies including elongated flexible straps such as metal strips secured around an object to be hoisted by latch means engaging the opposite ends of the straps. However, such devices which can be fixedly secured to an object to be hoisted are typically limited by the length of the straps to use with an object of a given circumference and at best their use with objects of various circumferential dimensions either necessitates stocking a set of such devices of different predetermined strap lengths or adjustment of the length of the straps of such a device by its disassembly and reassembly with some difficulty and certainly with a commensurate loss of time. Other devices used for this purpose include an elongated flexible element composed of a roller chain or the like fixedly secured at one end to a hoisting fitting or other securing means and arranged to be adjustably engaged at various points along its length with another freely releasable fitting effective to secure the chain around an object only so long as the load is applied to lift the object and thereby maintain the flexible element in engagement with the freely releasable fitting. These devices are more readily employed with objects of various sizes but they lack the advantage of the devices described above in that they are not securely attached to an object to be lifted except during the actual hoisting operation.

In contrast to the inherent limitations of the various known types of hoisting means referred to above, the instant invention contemplates a universal hoisting sling composed of a minimum number of standardized cooperating elements of minimized weight and overall dimensions readily interfitted in a variety of configurations to provide suitably distributed support on various surface areas on smoothly contoured objects of varying size, shape, structural configuration, and weight. In addition, the various elements of the universal hoisting means of the instant invention may be quickly interconnected to be fixedly secured to an object to be hoisted independent of the application of hoisting force. Finally, the elements comprising the device of the instant invention may be arranged and releasably interfitted so that they may be quickly detached from an object after it has been hoisted into a closely confined location with minimal clearances to which an operator has very limited access.

An object of the instant invention is the provision of a hoisting sling universally adaptable for fixed attachment to and hoisting of objects of various sizes, external contours, structural configurations, and weight distributions.

Another object is to provide a universal hoisting sling composed of standard elements readily interconnected in various alternative configurations and easily adjusted to fixedly engage an object to be hoisted, all without the use of tools and even under extremely adverse conditions such as freezing temperatures.

Still another object is the provision of a hoisting sling composed of elements arranged for ready manipulation for disassembly and easy withdrawal from closely confined relatively inaccessible spaces upon disassembly.

Yet another object is the provision of means for single point suspension of relatively heavy objects comprising a limited number of component parts.

A final object is to provide standardized hoisting sling components of minimized size and weight having uniformly high strength characteristics and designed to be freely interchangeable with various cooperating elements of the hoisting sling.

Figures 3, 4, 5:
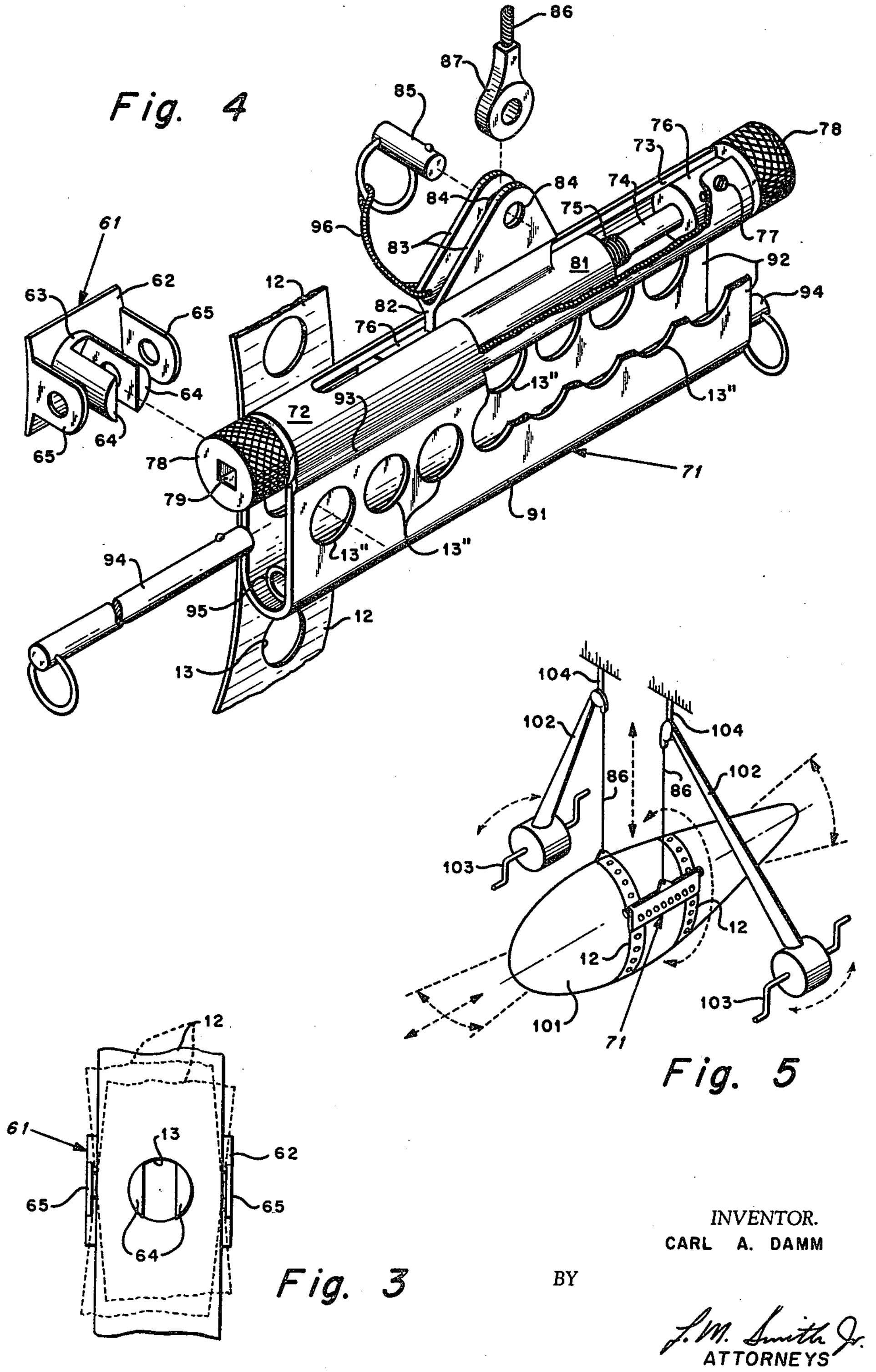
Figure 15:
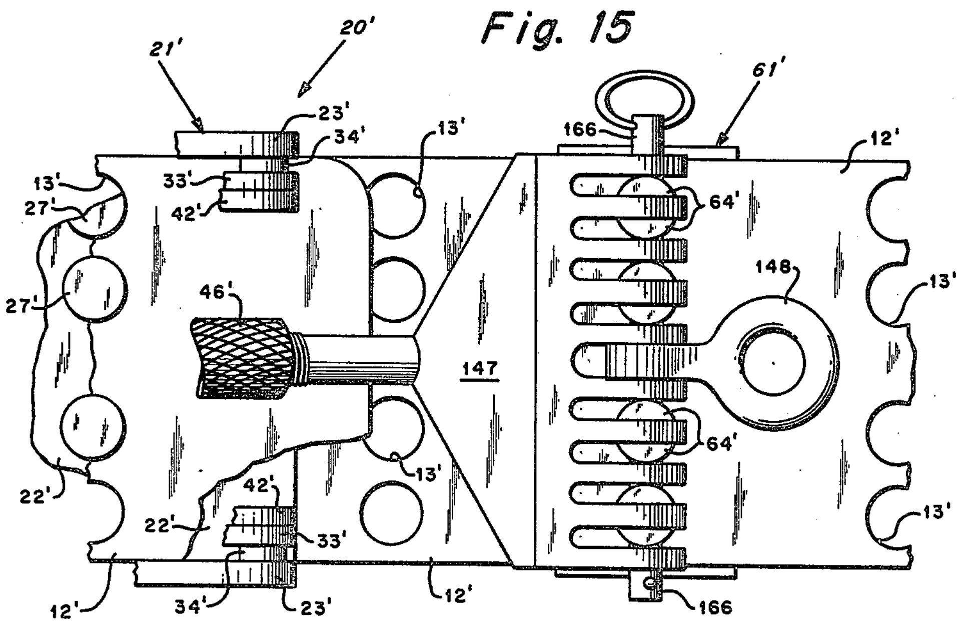
Figures 16, 17:
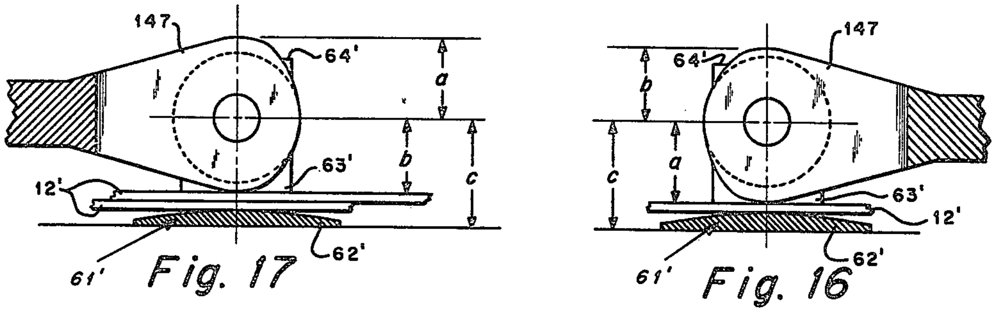
Figure 18:
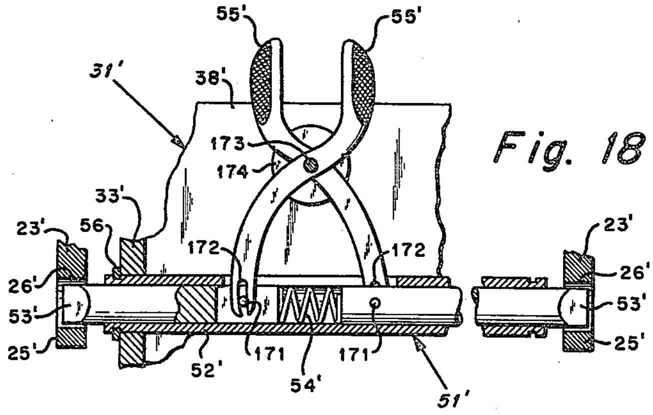

Other objects and many of the attendant advantages of this invention will be readily appreciated as the same becomes better understood by reference to the following detailed description when considered in connection with the accompanying drawing wherein:

FIG. 1 is an isometric view, partially broken away, of the preferred embodiment of the latch assembly of the instant invention secured in operative relation to the preferred embodiment of the hoisting band of the instant invention, FIG. 1*a* is a top plan view of a portion of the latch assembly broken away to show the trunnions of the latch adjustment mechanism, FIG. 1*b* shows an end view, partially broken away, of a modified configuration of the latch assembly illustrating details of the preferred embodiment of the safety lock assembly incorporated therein, FIG. 2 is a detailed isometric view of one hinged element of the latch assembly shown in engagement with a broken away portion of the hoisting band, and including a dashed line representation of the other hinged element, FIG. 3 is a plan view, broken away, of the preferred embodiment of the anchor fitting of the instant invention shown disposed in operative engagement with a hoisting band, FIG. 4 is an isometric view, partially broken away, of the preferred embodiment of the spreader bar assembly of the instant invention which may be used with multiple hoisting bands to form various configurations of the instant invention as shown in FIGS. 9 through 14 of this application, FIG. 5 is a simplified schematic representation of a typical arrangement for performing a hoisting operation employing the device of the instant invention, FIGS. 6 through 14 are schematic representations of the universal hoisting sling of the instant invention arranged in various different configurations to accommodate different loads, FIG. 15 is a plan view, partially broken away, of a modified wide hoisting band with multiple rows of apertures, a wide anchor fitting with multiple bosses, and a cooperating wide latch assembly including a clevis member with multiple fingers, FIGS. 16 and 17 are side elevations of the embodiment of the instant invention illustrated in FIG. 15 respectively showing the clamping action exerted on one band and on two overlapped bands by the clevis member and a cooperating anchor fitting, and FIG. 18 is a bottom plan view, partially broken away, of an alternative embodiment of the latch safety lock, shown in operable relation to certain portions of the respective jaws of the latch assembly.

Referring now to the drawings wherein like reference numerals refer to like or corresponding parts throughout the several views, FIG. 1 shows the preferred embodiment of the latch assembly of the instant invention and a cooperating anchor fitting disposed in operable relation to a hoisting band of the instant invention.

The elongated hoisting bands 12 of the instant invention are fabricated from strips of thin flat sheet material such as stainless steel, other high strength flexible sheet material, or the like of the order of two inches in width and about one thirty-second of an inch thick in the preferred embodiment, provided with a series of regularly spaced circular apertures 13 of equal size and shape spaced at regular intervals along the length of the band 12 for adjustment of the effective length of hoisting band 12 by the selection of the proper apertures 13 for the insertion of cooperating elements. In order to facilitate the assembly of cooperating elements with the band, particularly in multiple band installations, the successive apertures 13 may be identified by reference markings such as those indicated at 14 in FIG. 1. For facilitated handling of the hoisting bands 12, especially for one-man installation around objects of relatively large circumference, the elongated bands may be pre-shaped to a suitable predetermined circular configuration of a radius such as 9 inches so that the bands will grip an object more than 18 inches in diameter with the respective ends overlapping.

The latch assembly generally designated by the reference numeral 20 includes an outer jaw generally designated by the reference numeral 21 including a flat base plate 22 which may be slightly curved as shown in FIGS. 1 and 2 to approximate the contour of objects with which it may be used, and a pair of upstanding parallel flanges 23 formed integrally with or fixedly secured to the opposite edges of the base plate 22. The upper extremities of the respective flanges 23 are provided with aligned circular apertures 24 constituting hinge points for engagement with the inner jaw generally designated by the reference numeral 31 and described more fully below. In addition, each of the flanges 23 includes an upstanding ear 25 provided with a suitable aperture 26 and spaced from the hinge point aperture 24 as shown best in FIG. 2 for the accommodation of a cooperating element of the safety lock assembly generally designated by the reference numeral 51, described in detail below. Finally, the outer jaw 21 is provided with a circular band engaging boss 27 shown in FIG. 2 projecting from a central location on the inner face of the base plate 22 for closely interfitting engagement with an aperture 13 in the hoisting band 12 to operatively interconnect the hoisting band 12 and the latch assembly 20. The height of the boss 27 must be sufficient to extend through and beyond the hoisting band 12 to insure effective transfer of the load and assure sustained clamping action by the respective jaws.

The inner jaw generally designated by the reference numeral 31 includes a flat base plate 32 slightly curved to complement base plate 22 of outer jaw 21 and a pair of parallel upstanding flanges 33 formed integrally with or fixedly secured to the opposite edges of base plate 32. The flanges 33 of the inner jaw 31 are respectively provided with opposed outwardly extending apertured shoulders 34 disposed in alignment with the apertures 24 in the flanges 23 of the outer jaw 21 for the insertion of suitable hinge pins 36 therethrough for pivotal interengagement of the outer jaw 21 and the inner jaw 31. The inner jaw 31 is also provided with an elongated aperture 37 through the base plate 32 thereof as indicated in FIG. 2, to receive the boss 27 projecting through the cooperating hoisting band 12 and thereby provide clamping engagement of the portion of the hoisting band 12 passing between the respective base plates of the inner and outer jaws of the latch assembly. Finally, the inner jaw 31 is provided with a manually controlled handle 38 for the latch assembly which may conveniently comprise a flat member disposed substantially parallel to the base plate 32 and connected at its opposite edges to the upper edges of flanges 33 of the inner jaw 31.

Figures 6, 7, 8:
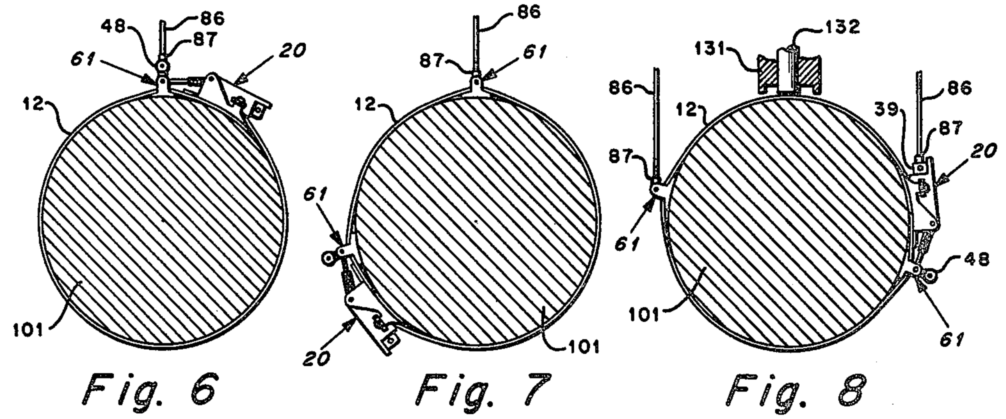

The latch assembly 20 additionally includes a latch adjustment mechanism generally designated by the reference numeral 41 and including a cross head 44 supported by a pair of trunnion plates 42 engaged by the hinge pins 36 and restrained against rotation by a pair of trunnion pins 43 extending through the respective flanges 33 of the inner jaw 31. The respective trunnion plates 42 are provided with centrally disposed circular apertures to receive generally cylindrical trunnions 45 projecting from the opposite ends of the cross head 44 as shown in FIG. 1*a*. The pivotally mounted cross head 44 provides support for a relatively rotatable adjustment barrel 46 disposed longitudinally of the latch assembly 20, as shown in FIG. 1, and threadably engaged with an externally threaded eye bolt 47 the eye of which is pivotally connected to a link 48 by a wrist pin 49 to provide an articulated connection with the link 48 provided with a pair of apertured arms oppositely offset to receive the apertured end fitting 87 of a hoisting cable 86 as shown in FIG. 6 which may be secured to the link 48 by the insertion of locking pin 50 through the apertures in the arms of link 48. With the eye bolt 47 restrained against rotation by engagement with an anchor fitting as shown in FIG. 1, continuous adjustment of the effective length of hoisting band 12 between adjacent apertures 13 is obtained by rotating adjustment barrel 46 manually.

The configuration of the respective operating elements of the latch assembly 20, described above, is such that these elements comprise an over-center toggle assembly arranged so that a load applied to the latch assembly through the boss 27 and the eye bolt 47 tends to maintain the latch assembly in its closed position, illustrated in FIG. 1, by virtue of the fact that the axis of rotation of the trunnions 45 projecting from the cross head 44 is slightly closer to the base plate 22 of the outer jaw 21 than the axis of rotation of the hinge pins 36 interconnecting the respective jaws, with the jaws in their clamping position as shown in FIG. 1. Hence, no additional elements are required to provide an operative latch assembly. However, to insure against inadvertent disengagement of the latch assembly while it is loaded, the latch assembly 20 is provided with a safety lock assembly generally designated by the reference numeral 51, disposed as shown in FIG. 1 and illustrated in somewhat greater detail in FIG. 1*b*, which comprises a cylindrical barrel 52 extending transversely of and fixedly secured to the inner jaw 31 and a pair of opposed locking pins 53 enclosed and supported by barrel 52 and biased outwardly into engagement with the respective ears 25 by a centrally disposed double acting biasing spring 54 also contained within the cylindrical barrel 52. The pins 53 may conveniently be tapered on the side engaging the respective ears 25 for automatic displacement of the respective pins 53 by engagement with ears 25 as the inner jaw 31 is rotated into the closed position relative to the outer jaw 21 shown in FIG. 1. Finally, the respective pins may be provided with manually positioned pin actuators 55, which serve to restrain the respective locking pins 53 against rotation since they extend through suitable slots in the barrel 52 and the flanges 33 of the inner jaw 31. The respective pin actuators 55 may be engaged by suitable restraining means such as spring retaining rings 56 engaged in annular grooves at the opposite ends of the cylindrical barrel 52 as shown in FIG. 1*b* to limit displacement of the respective locking pins 53 by the biasing spring 54. With the safety lock assembly 51 incorporated, the inner jaw 31 may be pivoted into operative relation to the outer jaw 21 by manually depressing the handle 38 to deflect the respective locking pins 53 by engagement with the respective ears 25 until the locking pins 53 are aligned with the apertures 26 through the respective ears 25 at which time the locking pins 53 are biased into engagement with the apertures 26 of the ears 25 by the biasing spring 54. Thereafter, the latch assembly 20 can only be disengaged from a cooperating hoisting band 12 by simultaneously manually depressing both pin actuators 55 against the biasing action of spring 54 to disengage both locking pins 53 from the respective ears 25. Since the respective actuators 55 are spaced apart only about three inches in the preferred embodiment of the latch assembly, they may conveniently be depressed simultaneously by one hand operation. FIG. 1*b* also illustrates a modification of the preferred embodiment of the latch assembly 20 to the extent that it also includes spaced parallel apertured hoisting webs 39 disposed intermediate of and parallel to flanges 33 and interconnecting base plate 32 and handle 38 to form an additional hoisting point which may be used as shown in FIG. 8 for the connection thereto of the end fitting 87 of a hoisting cable 86 by means of a locking pin 50.

Referring now in particular to the showing in FIG. 2, it should be apparent from the configuration of the respective jaws 21 and 31 that clockwise rotation of the inner jaw 31, as shown in FIG. 1, through about 90 degrees will displace the base plate 32 of the inner jaw a substantial distance from the base plate 22 of the outer jaw 21 by virtue of the off-set location of the hinge pins 36 to facilitate ready insertion or removal of a hoisting band 12. Conversely, after the proper aperture 13 of a hoisting band 12 has been engaged with the boss 27 on the base plate 22 of the outer jaw 21, rotation of the inner jaw 31 in the opposite direction through the substantially closed position of jaw 31 shown in dashed lines in FIG. 2 will result in passing the elongated aperture 37 over the upper end of the boss 27 as the base plate 32 is ultimately positioned substantially parallel to the base plate 22 and in clamping relation to the hoisting band 12 interposed therebetween, as shown in FIG. 1.

Referring again to FIG. 1, it will be noted that the latch assembly 20 is arranged to cooperate with a standard anchor fitting generally designated by the reference numeral 61, which may be inserted through any aperture 13 of a hoisting band 12 to secure the other end of the hoisting band 12 at the necessary point to encircle and fixedly engage an object being hoisted. The anchor fitting 61 includes a flat slightly curved base plate 62 which may be tapered to its opposite ends to accommodate the flexible band 12 with minimum discontinuities and thereby avoid excessive stress concentrations in the band or the fitting. In addition, the anchor fitting 61 includes a circular boss 63 secured centrally of the base plate 62 of the same circumferential size as boss 27 of the latch assembly 20 to closely interfit any aperture 13 in the hoisting band 12 to absorb the load applied thereto through the latch assembly. The height of boss 63 must be sufficient to extend through one thickness of hoisting band 12 and most of the thickness of a second band for effective load transfer where fitting 61 is used to interconnect two bands. The boss 63 also includes a pair of integral upstanding hoisting lugs 64 respectively apertured to receive a locking pin 66 which passes through the wrist pin 49 of the latch assembly 20 or through the fitting 87 on the end of a hoisting cable 86 when the anchor fitting is used alone and the hoisting cable 86 is attached directly to the anchor fitting 61 in the manner described below. Finally, the anchor fitting 61 includes a pair of upstanding position limiting ears 65 formed integrally with or fixedly secured to the opposite edges of the base plate 62 and apertured to receive the locking pin 66.

The detailed showing in FIG. 3 of a typical anchor fitting 61 in relation to a hoisting band 12 emphasizes the versatility of the instant invention by virtue of its adaptability to the accommodation of and its provision of proper support for various non-cylindrical shapes. This versatility is particularly attributable to the fact that the hoisting band 12 is not fixedly restrained relative to the anchor fitting 61, but instead may be angularly displaced by small amounts as indicated in FIG. 3 limited only by the position limiting ears 65 of the anchor fitting 61 provided to prevent excessive angular displacement of the anchor fitting 61 relative to a hoisting band 12. This versatility is illustrated particularly in the showings of typical installations of the instant invention illustrated in FIGS. 12 and 14 wherein the configuration shown is made possible by the adjustable relationship illustrated in FIG. 3.

FIG. 4 shows the preferred embodiment of the spreader bar assembly generally designated by the reference numeral 71 constructed to be used as necessary in cooperation with the other elements of the instant invention illustrated in FIGS. 1 through 3 and described in detail above. As illustrated, the spreader bar assembly 71 includes an elongated hollow tubular member 72 provided with an elongated slot 73 therethrough extending longitudinally of its upper side to and through one end thereof, an elongated shaft 74 disposed concentrically of the tubular member 72 and provided with a threaded portion 75 disposed intermediate its ends, an annular plug or bushing 76 encircling one end of the elongated shaft 74 and fitted into the slotted end of the tubular member 72, fastening means such as screws 77 extending through the tubular member 72 and into the plug or bushing 76 to secure this element to the tubular member 72, and a pair of manually rotatable knobs 78 respectively secured to the opposite ends of the elongated shaft 74 against rotation relative to the shaft and against removal therefrom by suitable attachment means such as transversely extending pins, not shown, and provided with suitable recesses concentric of the ends thereof such as square apertures or other suitably contoured openings for engagement of a tool for turning the knobs when adjustment is required while the spreader bar assembly 71 is subjected to heavy loading conditions. The spreader bar assembly also includes an annular elongated slide member 81 encircling the elongated shaft 74 and internally threaded for engagement with the intermediate threaded portion 75 of shaft 74, so that the member can be positioned along the length of slot 73 by rotation of shaft 74 controlled by knobs 78. The annular slide member 81 is provided with a radially extending web 82, fixedly secured to or formed integrally with the slide member 81, extending through and movable with the slide member 81 along the elongated slot 73 and in turn supporting a pair of spaced hoisting ears 83 provided with aligned apertures 84 therethrough for the accommodation of a short locking pin 85 inserted therethrough for engagement with an aperture in the end fitting 87 on a hoisting cable 86. The thickness of web 82 is less than the width of slot 73, so that the web 82 and the ears 83 supported thereby have limited freedom of movement angularly about the longitudinal axis of shaft 74. A U-shaped elongated member 91 including a substantially parallel pair of spaced legs 92 is fixedly secured along the free edges of legs 92 to the hollow tubular member 72 by suitable attachment means such as welded joints 93 to provide for selective attachment of anchor fittings 61 to the spreader bar assembly 71 by insertion of the anchor fittings 61 through suitably spaced sets of apertures 13 in the respective legs 92, each aperture 13" being disposed in alignment with the corresponding aperture 13 in the other leg 92. Anchor fittings 61 may be secured to the spreader bar assembly 71 by the insertion of locking pins 94 through the apertures in one or more anchor fittings 61. When the locking pins 94 are not in use they may conveniently be stowed in the spreader bar assembly 71 by insertion in generally cylindrical elongated pin stowage sockets 95 secured within the U-shaped elongated member 91 as by welding.

While the invention described herein is suitable for hoisting many diverse types of objects of a generally smoothly contoured configuration and particularly those cylindrical in cross section such as various items of general cargo, for example, the device comprising the instant invention is inherently particularly well suited for the safe handling of items of aircraft armament generally known as stores and including bombs, missiles, and other such armament items requiring safe and positively secured support during the stowage of these items on or within an aircraft. The instant invention is particularly suited, in connection with this application, to the hoisting of large stores into the bomb bays of aircraft to which access is limited and within which space is at a premium so that critical clearances exist at various points. Since many of the comments below with respect to the utilization of this device pertain particularly to this aircraft application, the object to be hoisted will hereafter be referred to generally as a store, although it is to be understood that, in general, the following description would be equally applicable to other types of objects.

FIG. 5 illustrates a typical application of the device comprising the instant invention to the hoisting of a store into the desired position for that store within the bomb bay of an aircraft for engagement with a releasable supporting means such as a bomb shackle. In this simplified representation of such an application a representative store 101 is shown supported by a pair of hoisting bands 12 interconnected by a pair of spreader bar assemblies 71 in turn connected at hoisting ears 83 comprising their respective hoisting points to the ends of a pair of hoisting cables 86 extending from a pair of conventional portable cable hoist assemblies 102 which may be provided with manually operable hand cranks 103, as illustrated, or with other suitable driving means. The cable hoist assemblies 102 are supported by a pair of fixed supporting fixtures 104 such as those provided within the bomb bay of an aircraft for detachably supporting cable hoist assemblies 102 during the hoisting operation. The vertical dashed arrows shown in FIG. 5 illustrate the directions of movement of the store in response to collective operation of the hand cranks 103 of cable hoist assemblies 102, while the dashed arrows encircling the store 101 indicate the manner in which the store can be rotated about its longitudinal axis by differential operation of the hand cranks 103 of the portable cable hoist assemblies 102. Similarly, the dashed arrows coincident with the longitudinal axis of the representative store 101 indicate the directions of movement of the store achieved by collective rotation of the lower ends of the cable hoisting assemblies 102 in opposite directions about vertical axes through the upper ends of the cable hoist assemblies 102 adjacent to the respective supporting fixtures 104. Finally, the curved dashed arrows at the forward end of the store indicate the angular displacement of the store in a horizontal plane, achieved by differential rotation about vertical axes of the cable hoist assemblies 102 or by displacement in opposite directions of the hoisting points of the spreader bar assemblies 71, and the curved dashed arrows at the rearward end of the store indicate the angular displacement of the store in a vertical plane, achieved by collective displacement of the hoisting points of the respective spreader bar assemblies 17 in the same direction relative to the center of gravity of the store.

The simplified representations in FIGS. 6 through 14 illustrate various configurations of the elements of the instant invention as they may be applied to various types of stores to accommodate various external shapes and various store constructions as well as to avoid projecting elements attached to the stores.

FIGS. 6, 7 and 8 showing cross sectional views of circular stores 101 illustrate various configurations of a single hoisting band and latch assembly installation possible with the elements comprising the instant invention. FIG. 6 shows a single hoisting band 12 secured by a single anchor fitting 61 and a single latch assembly 20 to provide single point hoisting using the link 48 of the latch assembly as the hoisting point. FIG. 7 illustrates an alternative arrangement for single point hoisting comprising a hoisting band 12 secured by a latch assembly 20 and a cooperating anchor fitting 61 so disposed as to be accessible from outside for removal when a store is hoisted up into a closely confined chamber such as the bomb bay of an aircraft. Here, a single additional anchor fitting 61 must be secured to a store at its uppermost point by the encircling hoisting band 12, in order to provide a single hoisting point. FIG. 8 shows a two point suspension employing the same elements as in FIG. 7 but with the latch assembly 20 and the cooperating anchor fitting 61 located on one side of the store and the additional anchor fitting 61 located on the opposite side of the store to provide two hoisting points, positioned slightly above the center of the store so supported to avoid the possibility of kinking and thereby dangerously weakening the hoisting cables. The showing in FIG. 8 also illustrates the use of the hoisting webs 39 provided on the inner jaw 31 of the latch assembly 20 as a hoisting point although the link 48 of the latch assembly could similarly have been used if the latch assembly were inverted from the position shown in FIG. 8. The modification of the latch assembly 20 embodying hoisting webs 39 is illustrated in FIG. 1*b*.

Figures 9, 10, 11:
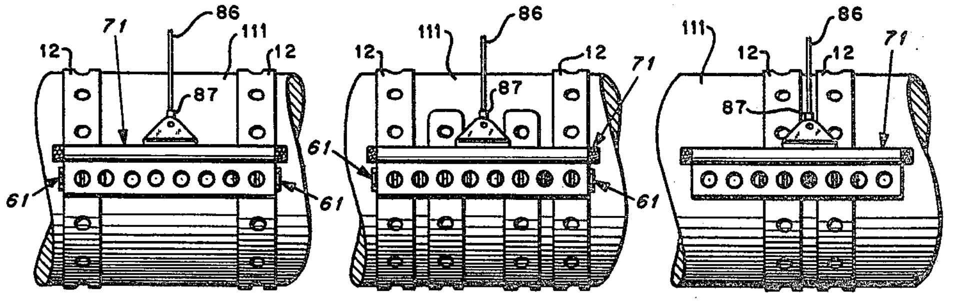

FIGS. 9, 10 and 11 illustrate the application of multiple hoisting band installations to a store having a cylindrical central portion 111 wherein a pair of spreader bar assemblies 71 is used in the general manner illustrated in FIG. 5 to provide adjustable two point suspension for the store. FIG. 9 illustrates a configuration of the instant invention suitable for use upon a store too heavy or too large to be safely supported by a single hoisting band assembly and hence preferably supported by a pair of relatively widely spaced hoisting band assemblies, preferably positioned at locations of maximum strength such as transverse bulkheads in the store, and interconnected by a pair of spreader bar assemblies 71, one of which is visible in FIG. 9. Attachment of the spreader bar assemblies to the respective hoisting bands 12 is by means of additional anchor fittings 61 as indicated in FIG. 4. In such an installation, the anchor fittings 61 are attached to the store by the respective hoisting bands 12 in the manner illustrated in FIGS. 7 and 8 above and to the spreader bar by locking pins not illustrated in this simplified showing. For a store too heavy to be supported by two bands or for a store of thin wall construction requiring wider load distribution, additional bands secured to the respective spreader bar assemblies 71 and passing under the store 111 may be added as shown in FIG. 10 by securing these bands also to the respective spreader bars by the insertion of additional anchor fittings 61 through these bands and through corresponding apertures 13 in the spreader bar assemblies. Alternatively, where a store is characterized by a concentrated high strength area as defined by one or more transverse bulkheads, it may be hoisted effectively by two or more closely spaced hoisting bands 12 positioned as shown in FIG. 11 and interconnected by a pair of spreader bar assemblies 71 to provide a pair of adjustable hoisting points.

Figures 12, 13, 14:
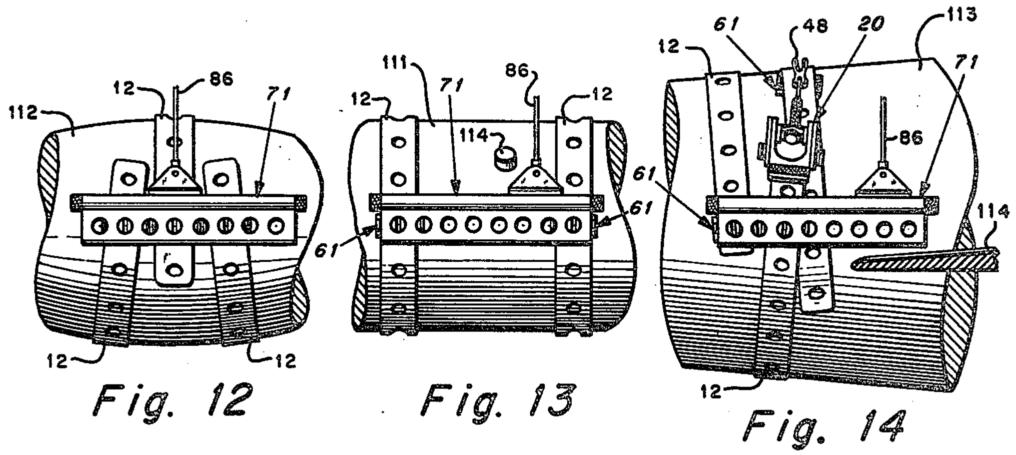

Stores characterized by non-cylindrical external contours such as streamlined stores or stores having a tapered section at the desired hoisting point may be hoisted by alternative configurations of the instant invention such as those shown in FIGS. 12 and 14. FIG. 12 illustrates the use of the limited relative angular movement of the hoisting bands 12 and their associated anchor fittings 61, as shown in FIG. 3, to dispose the hoisting bands supporting a streamlined store 112 by aligning the bands 12 so that they fit smoothly over the surface of the store 112 without an objectionable stress concentration along one edge of the bands 12. Where the degree of freedom of the band relative to the anchor fitting as illustrated in FIG. 3 is insufficient alone, the anchor fitting 61 can of course be offset by a limited amount relative to the associated spreader bar assembly 71 because the position limiting ears 65 of the anchor fitting 61 are made narrow enough to be displaced angularly to a limited degree about the boss 63 within the adjoining apertures 13″ in the legs 92 of the spreader bar assembly 71 through which they project. FIG. 14 illustrates the manner in which cooperating hoisting bands 12 may be oppositely offset around a tapered store 113 to fit the bands snugly over the contour of such a store and preferably at a high strength location such as a transverse bulkhead, whether or not the bulkhead is positioned longitudinally of the store coincident with the desired hoisting points.

Finally, FIGS. 13 and 14 illustrate configurations of the device comprising the instant invention arranged to position the hoisting points so that they clear a projecting element 114 protruding from a store 111. FIG. 13 illustrates an asymmetrical arrangement of the elements comprising the instant invention with the hoisting bands disposed on opposite sides of the projecting element 114. FIG. 14 illustrates a cantilevered arrangement in which the spreader bar assemblies 71 are secured in a substantially horizontal position by a plurality of hoisting bands 12 encircling the store so that the spreader bar assemblies are constrained in a substantially horizontal position by a band disposed as a saddle over the store to provide cantilevered support for the hoisting points in a location longitudinally of the store either of insufficient local strength for clamping engagement by the hoisting bands or otherwise inaccessible by virtue of the presence of projecting elements 114, such as wings, fins, or other stabilizing air foil surfaces.

Certain general characteristics of various elements of the instant invention may best be noted at this time. First, with respect to the hoisting bands 12, it is anticipated that these bands will be supplied in sufficient quantities for foreseeable needs in a standard length of general utility, such as, for example, substantially five foot lengths which will accommodate most stores generally used except those of extremely large cross sections. However, in any instance where the cross section of the store to be hoisted has a circumference in excess of the length of a standard hoisting band, the requisite length can readily be achieved by interconnecting two or more bands lengthwise by means of an anchor fitting 61 inserted through apertures 13 in the respective bands. Second, it is to be understood that the various locking pins illustrated are of a standard diameter for maximum interchangeability and that all such locking pins are provided with suitable means for maintaining them in an operable position such as a spring biased ball detent as illustrated in the various views of the respective locking pins, and that the various locking pins will be provided with a pull ring for easy operation, in turn connected by a suitable flexible restraining wire 96, as shown in FIG. 4, to a cooperating element of the instant invention to prevent loss or misplacement of the respective locking pins. Third, while retaining rings 56 are shown only around barrel 52 in FIGS. 1 and 1b, it is to be understood that the various pins such as hinge pins 36 and trunnion pins 43 and barrel 46 used in the latch assembly 20 may be similarly secured by a head formed on one end and a retaining ring engaged in an annular groove in the opposite end, although such details have been omitted from the showing in FIG. 1 and in other figures to simplify the showing of the principle elements of the instant invention. Fourth, since the base plate 22 and the base plate 62 are slightly curved adjacent the bosses 27 and 63, respectively, the apertures 13 should ideally be slightly elongated rather than perfect circles. However, such a configuration of apertures 13 would require special tooling. Instead, a satisfactory snugly interfitted relationship between apertures 13 and the respective bosses 27 and 63 has been achieved by punching circular apertures 13 to a slightly enlarged circumference to accommodate the curvature of the respective base plates. Fifth, since the hoisting cables 86 are commonly stranded wire with swaged end fittings 87, it is important to avoid restraining the end fittings under load so that they kink the cables 86 adjacent thereto, because this results in dangerously weakening the cables. The possibility of this restraint of end fittings 87 is minimized when the instant invention is used by means of the limited freedom of motion illustrated in FIG. 3 and the limited angular freedom of motion of slide member 81 about shaft 74 noted in describing the spreader bar assembly 71, both in addition to the freedom of pivotal motion provided by the respective locking pins 50 and 85.

As noted above, the teachings of the instant invention are also applicable to general cargo handling operations for handling cylindrical or other smoothly contoured items. For the greatest ease of handling objects, the single suspension point configurations illustrated in FIGS. 6 and 7 are most desirable, since a minimum number of parts is used, thus minimizing assembly and disassembly time before and after the hoisting operation. However, since the capacity of the single band configuration is inherently limited by the strength of the narrow band and the cooperating latch assembly and by the limited distribution of the load possible with a single relatively narrow band, resort may be had to the modification of the instant invention illustrated in FIGS. 15, 16 and 17 incorporating a relatively much wider hoisting band 12′ provided with multiple rows of apertures 13′ cooperating with a substantially wider anchor fitting 61′ having a plurality of bosses 63′ projecting from a base plate 62′ and supporting hoisting lugs 64′, and a substantially wider latch assembly 20′ including a clevis member 147 replacing the eye bolt 47 of the latch assembly 20 illustrated in FIG. 1 and secured to anchor fitting 61′ and hoisting ring 148 by locking pin 166. The primed numbers designated various parts of the latch assembly generally designated by reference numeral 20′ in FIG. 15, including the outer jaw 21′, flanges 23′ and 33′ of the respective jaws, base plate 22′, bosses 27′, apertured shoulders 34′, trunnion plates 42′, and adjustment barrel 46′, identify parts corresponding to parts designated by corresponding numbers in the showing of the latch assembly 20 illustrated in FIG. 1. With a hoisting band 12′ six to eight inches or more in width provided with a plurality of relatively smaller apertures 13′ therethrough, the higher strength capability and load distributing properties of an installation such as that illustrated in FIG. 10 may be achieved with the relatively limited number of elements corresponding to the configurations of the instant invention illustrated in FIGS. 6 and 7. In addition, where two point hoisting, as by means of a bridle, is desirable a second anchor fitting 61′ and a suitable hoisting ring 148 may be used as illustrated in FIG. 8.

FIG. 15 illustrates the operable cooperation between the modified wide band 12′, the modified wide anchor fitting 61′ and the clevis member 147 of the modified wide latch assembly 20′ otherwise similar to latch assembly 20, except for the transversely extending plurality of bosses 27′ replacing a single central boss 27. This embodiment of the instant invention carries over the clamping action of the inner jaw and outer jaw of the latch assembly to the interacting clevis member 147 and anchor fitting 61′ by shaping the clevis member 147, as shown in FIG. 16 so that it exerts a camming action against the hoisting band 12′ when it is rotated clockwise as shown in FIG. 16 into the position occupied when the latch assembly 20′ is closed in the manner corresponding to the showing of latch assembly 20 in FIG. 1. In order to accommodate a configuration in which the anchor fitting 61′ must interconnect a pair of hoisting bands 12′ in addition to securing the clevis member 147 of a latch assembly, the other side of the clevis member 147 may be shaped to form a similar camming surface positioned to accommodate two thicknesses of the hoisting band 12′ between the anchor fitting 61′ and the camming surface of the clevis member 147, as shown in FIG. 17, when the latch asesmbly 20, is positioned as shown in FIG. 1. Thus, by selectively rotating the clevis member 147 through 180 degrees before it is connected to anchor fitting 61' by insertion of locking pin 166, the clevis member may be suitably disposed either as shown in FIG. 16 or as shown in FIG. 17. The identification of the alternative camming surfaces is facilitated by the provision of a reference marking such as the circle shown in dashed lines in FIGS. 16 and 17. Finally, while the apertures 13' are shown as circular, as in the universal embodiment of the instant invention, they may be any suitable shape such as square, rectangular, or elongated parallel slots accommodating elongated bosses supporting flat parallel hoisting lugs interfitting with clevis member 147, since this embodiment of the instant invention does not feature relative angular movement of the anchor fitting 61' and hoisting band 12' corresponding to that illustrated in FIG. 3.

Noting that the width of the hoisting band 12' illustrated in FIG. 15 may be 6 to 8 inches or more, the use in the cooperating latch assembly 20' of a safety lock assembly 51, such as that illustrated in FIG. 1 and in detail in FIG. 1*b*, would preclude convenient simultaneous operation of the pin actuators 55 with one hand, an alternate embodiment of the safety lock assembly, generally designated by reference numeral 51', suitable for use with the embodiment of the instant invention illustrated in FIG. 15 and capable of being operated conveniently with one hand is illustrated in FIG. 18 including a showing of a substantially elongated cylindrical barrel 52' provided at its opposite ends with annular grooves for engagement with retaining rings 56 to secure the barrel 52 in fixed relation to the inner jaw 31'. The cylindrical barrel 52' contains a pair of opposed locking pins 53' biased in opposite directions by a biasing spring 54' and each longitudinally slotted adjacent the inner end thereof to accommodate a transversely extending pin 171 for engagement by an elongated slot 172 in the end of one of the coacting locking pin actuators 55' both rotatably supported and operatively interconnected by a pivot pin 173 passing through both pin actuators 55' intermediate the ends thereof and in turn supported by fixed supporting means such as one or a pair of blocks 174 fixed to and projecting from either or both of the base plate 32' and the handle 38' of the inner jaw 31'. In addition, FIG. 18 shows the respective locking pins 53' in operative relation to apertures 26' through the flanges 23' of the outer jaw 21'. With the embodiment of the safety lock assembly illustrated in FIG. 18, it is not necessary to shape the flanges 23' to form ears encircling apertures 26. In order to avoid interference with hoisting webs 39' which may be positioned centrally of the inner jaw 31' as in FIG. 1*b*, the safety lock assembly 51' may be shaped asymmetrically with one locking pin 53' substantially longer than the other so that the pin actuators 55' may be disposed to one side of the inner jaw 31' clear of the hoisting webs 39'.

In operation, the various elements of the instant invention including the embodiment illustrated in FIGS. 15, 16 and 17 are readily assembled in a minimum of time without the use of any tools by interconnecting the various types of elements as required in the particular configuration desired and securing the interconnected elements by inserting the requisite locking pins to maintain the various elements in their operatve relationship during a hoisting operation. Similarly, when a hoisting operation is completed by securing a store by means other than the hoisting sling of the instant invention the various elements of the instant invention interconnected for the hoisting operation may be disengaged and withdrawn from a store very quickly by one hand operation of one latch assembly per band encirclement used, and thereafter further disassembly if desired is accomplished by withdrawing the respective locking pins and disengaging the various interconnected elements of the instant invention without the use of any tools for this operation.

In the simplest configuration of the instant invention a single hoisting band 12 is combined with a single latch assembly 20 and a single cooperating anchor fitting 61 disposed as shown in FIG. 6 with the respective elements operatively interconnected as shown in detail in FIG. 1. With this arrangement, the anchor fitting 61 is inserted through a selected aperture 13 of hoisting band 12 such that the band 12 encircles an object or store to be hoisted thereby with the aperture 13 adjacent to the remote end of the band 12 engaging the boss 27 in the latch assembly 20 as shown best in FIG. 2 so that the end of the hoisting band 12 clears the boss 63 of the anchor fitting 61 as shown in FIG. 1 sufficiently to permit the necessary manipulation of the adjustment barrel 46 of the latch adjustment mechanism 41 relative to the threaded eye bolt 47 so that the arrangement of elements described above fixedly engages an object when the latch assembly 20 is positioned in its operative closed position as illustrated in FIG. 1. Upon attachment of this configuration of the device of the instant invention and any of the others described below, it may be necessary to make a fine adjustment of the effective length of the hoisting band 12 in clamping engagement with a store or other object after preliminary selection of the aperture 13 which approximates the proper effective length. This fine adjustment can be effected with the latch assembly closed, as shown in FIG. 1, by rotating the adjustment barrel 46 until the hoisting band 12 snugly engages the store or other object it encircles. If an increased tension is desired on the clamping band 12, the latch assembly may be opened by depressing the pin actuators 55 and lifting the handle 38 so that the adjustment barrel 46 may be rotated in the same direction a small additional amount relative to the eye bolt 47. Thereafter, reclosing the latch assembly will impose a tension on the associated hoisting band proportional to the number of additional turns applied to the adjustment barrel 46. The arrangement of the latch adjustment mechanism 41 is such that the latch assembly 20 may be opened and closed without disturbing the setting of the adjustment mechanism. Thus, once the latch adjustment mechanism has been positioned at the proper setting, the device of the instant invention can be removed from one store and be replaced on that or a like store simply by opening and closing the latch without adjustment of barrel 46.

It should be noted that any excess length of the hoisting band 12 in addition to the portion thereof required to encircle an object or store is positioned beneath the latch assembly 20 and the portion of the hoisting band 12 adjacent thereto without substantially increasing the circumferential dimension of the object to which it is attached since the thickness of the preferred embodiment of band 12 is of the order of a thirty-second of an inch. As noted above, in the event that a single standard length band is insufficient to encircle an object to be hoisted an additional band or bands may be connected lengthwise with the original band by the use of an additional anchor fitting or anchor fittings as required to interconnect successive bands lengthwise.

In order to perform a hoisting operation, the end fitting 87 of a hoisting cable 86 is connected to the link 48 of the latch assembly 20 by the insertion of a locking pin 50 through the link 48 and the end fitting 87.

After an object or store has been secured in the desired position into which it has been hoisted, the locking pin 50 is withdrawn to disengage the device comprising the instant invention from the hoisting cable 86 and the latch assembly 20 may be released by concurrently depressing both pin actuators 55 to disengage the respective locking pins 53 from the respective ears 25 to permit rotation of the inner jaw 31 out of operative engagement with the outer jaw 21 of the latch assembly 20. Thereafter, the entire assembly including the hoisting band 12, the anchor fitting 61, and the latch assembly 20 can readily be withdrawn from around an object or store hoisted thereby.

Noting that the type of bomb shackles used for stores mounted upon high speed aircraft necessarily include bomb ejector mechanisms and that the maximum clearance between a store and the cooperating ejector mechanism is of the order of $\frac{1}{16}$ to $\frac{1}{8}$ of an inch, it becomes apparent that the radial thickness of the hoisting means for a store to be positioned adjacent to the bomb shackle and the cooperating bomb ejector means incorporated therein is limited to a maximum thickness of about $\frac{1}{16}$ to $\frac{1}{8}$ of an inch, a critical dimension substantially less than the thickness of many existing hoisting means. However, the configurations of the instant invention shown in FIGS. 8 through 14 in which two hoisting points are used meet this requirement since the maximum thickness of the hoisting band passing across the upper side of the store adjacent to such a bomb shackle, represented schematically in FIG. 8, is of the order of $\frac{1}{32}$ of an inch. For example, considering the showing in FIG. 8 as illustrative of this feature, the store may be hoisted into operative engagement with the releasable supporting elements of a bomb shackle with the hoisting band 12 interposed between the store and the bomb ejector mechanism 132 incorporated in the bomb shackle 131. Thereafter the hoisting band 12 can be withdrawn readily from this position simply by disengaging the hoisting band from the latch assembly 20 and by removing any anchor fitting 61 attached to the band 12 between its free end and the portion of the band passing between the store and the ejector mechanism 132. A corresponding procedure followed with respect to any of the configurations shown in FIGS. 8 through 14 will similarly permit removal of one or more hoisting bands wherever such minimum clearance is encountered.

The operation of the embodiment of the instant invention disclosed in FIG. 15 is essentially the same as that for the configuration illustrated in FIG. 6 or that illustrated in FIG. 7, with the additional requirement that care must be taken on assembly of the respective elements to properly position the clevis member 147 relative to the anchor fitting 61′ either as shown in FIG. 16 or as shown in FIG. 17 depending on whether one or two thicknesses of hoisting band 12′ is to pass beneath the clevis member 147. While the hoisting ring 143 shown in FIG. 15 is designed for general utilization with various types of hoisting hooks it could readily be replaced with a link such as link 48 particularly shaped for pin connection to a cooperating member such as the end fitting 87 on the hoisting cable 86.

In the configurations of the instant invention illustrated in FIGS. 9 and 11 in which spreader bar assemblies 71 are employed, the assembly may proceed initially as described with respect to FIG. 6 with the additional requirement that the requisite additional anchor fittings 61 be positioned beneath and extending through the respective hoisting bands 12 at the proper positions for engagement with and attachment to the respective spreader bar assemblies 71 so that the spreader bar assemblies may be installed as illustrated after the respective hoisting bands 12 are secured to an object or store by operation of the latch assemblies associated therewith. In the configurations of the instant invention illustrated in FIGS. 10 and 14 where additional hoisting bands 12 are attached to the respective spreader bar assemblies 71 for effective engagement only half way around an object, at least one end of each of such supplementary hoisting bands may be secured initially to a spreader bar assembly 71 by suitably positioned anchor fittings 61 in the manner illustrated in FIG. 4 before the respective spreader bar assemblies are secured to the hoisting band assemblies fully encircling the object or store to be supported by the instant invention and additional anchor fittings 61 must be inserted through the respective bands for engagement with the other spreader bar assembly 71. Alternatively, in a configuration such as that shown in FIG. 12 where no band assembly fully encircles an object or store, the various hoisting bands 12 may be operatively connected to the respective spreader bar assemblies 71 by anchor fittings 61 before the entire configuration is secured in clamping engagement around an object or store in the manner illustrated in FIG. 12.

In order to perform a hoisting operation with any of the configurations of the instant invention illustrated in FIGS. 9 through 14 the end fittings 87 of hoisting cables 86 must be secured to the ears 83 of the spreader bar assemblies 71 by insertion of pins 85 through the apertures 84 and the aperture in end fitting 87. The ears 83 are positioned longitudinally of the spreader bar assembly 71 by manual manipulation of the knobs 78 to properly position the slide member 81 supporting the hoisting ears 83. This manual manipulation of the knobs 78 may be accomplished either prior to or during the hoisting operation, except that under extremely heavy loads it may be necessary to manipulate the knobs 78 by the insertion of a suitable tool in the aperture 79 provided in each of the knobs 78. Thereafter, the hoisting operation for configurations of the instant invention employing the spreader bar assembly 71 may be performed generally as described above with respect to the showing in FIG. 5.

When the hoisting operation is completed using a configuration employing the spreader bar assembly 71, the device comprising the instant invention is likewise released by initially withdrawing pins 85 and then opening the respective latch assemblies 20 and by disconnecting the respective elements of the instant invention as necessary by withdrawing the respective locking pins interconnecting these elements.

Conversely, the various configurations of the instant invention can readily be attached to a store with the store suspended from a fixture such as an ejector bomb rack by first sliding hoisting bands 12 around the store and beneath the ejector bomb rack and thereafter assembling the additional elements of the instant invention to the hoisting bands as necessary to provide a suitable hoisting sling for lowering the store upon its release from the bomb rack, as during an aircraft disarming operation. Here again, the procedure for encircling a store with the hoisting band is facilitated even for a single operator by the fact that the bands are initially preshaped to a circular configuration so that an operator may slide the free end of the hoisting band 12 beneath an ejector bomb rack with a minimum of difficulty despite the very limited clearance provided, even when he is performing this operation from the side of the store remote from the location of the bomb rack as may be necessary with a store suspended in the bomb bay of an aircraft.

It should be noted that the minimized dimensions of the device comprising the instant invention are such that the height of the anchor fittings 61 projecting radially from the surface of a store need not be more than substantially 1 inch for a hoisting band and cooperating elements capable of safely lifting up to 2500 lbs. in fleet service hoisting conditions. In addition, the cooperating spreader bar illustrated in FIG. 4 has been designed so that it does not appreciably add to the radial dimension of an anchor fitting attached to a store despite the fact that the use of a pair of such spreader bar assemblies interconnecting a pair of hoisting bands 12 of the size contemplated increases the safe capacity of the configuration thus achieved to 5000 lb. or more. Finally, the preferred embodiment of the latch assembly illustrated in FIG. 1 and having a corresponding load capacity may be constructed to have a maximum dimension radially of a store of less than 2 inches with the respective jaws in the positions shown in FIG. 1.

Thus, the instant invention provides a universal hoisting sling composed of a relatively limited number of compact freely interchangeable cooperating parts which may be interconnected very quickly without the use of tools in various configurations to accommodate various sizes and shapes of smoothly contoured loads having different surface contours, structural configurations, and weights. In yet another application of the instant invention, it may be used to support stores or other objects during static tests with anchor fittings 61 projecting through the hoisting bands 12 at predetermined suitable locations for the connection of cables or other means of applying appropriate loads to the object undergoing tests.

The various exemplary dimensions of the various components of the instant invention referred to herein are intended to be illustrative only and in no wise limiting since none of these dimensions are critical to the successful employmet of the instant invention.

Obviously many modifications and variations of the present invention are possible in the light of the above teachings. It is therefore to be understood that within the scope of the appended claims the invention may be practiced otherwise than as specifically described.

What is claimed is:

1. A hoisting sling comprising a substantially elongated hoisting band consisting of a strip of perforate flexible flat material of substantially constant thickness; at least one anchor fitting including a generally flat base means, at least one band engaging means projecting from one side of said base means, and attachment means projecting from each said band engaging means; and a latch assembly including a first generally flat rectangular base means and first and second substantially parallel upstanding flanges projecting from opposite edges and to one side of said base means, an inner jaw including a second generally flat rectangular apertured base means and third and fourth substantially parallel upstanding flanges projecting from opposite edges and to one side of said second base means, pivot means rotatably interconnecting said first and third flanges and said second and fourth flanges for rotation of said outer jaw and said inner jaw from a position in which said first and said second base means are widely separated to a position in which said first and said second base means are in juxtaposition and substantially parallel, adjustable latch attachment means, means for pivotally connecting said latch attachment means to said third and fourth flanges in an over-center toggle relation to said pivot means when said first base means and said second base means are in juxtaposition, and hoisting band attachment means projecting from said first base means through a hoisting band and into interfitting relation with said apertured second base means.

2. A device as described in claim 1 wherein said hoisting band is provided with a series of substantially identical circular apertures therethrough spaced at predetermined intervals longitudinally of said hoisting bands, the band engaging means of said anchor fitting comprises a circular upstanding boss, and the hoisting band attachment means of said latch assembly comprises a cylindrical upstanding boss.

3. A device as described in claim 1, wherein said hoisting band is provided with a plurality of series of substantially identical apertures therethrough spaced at predetermined intervals longitudinally of said hoisting band with corresponding apertures of the respective series thereof disposed in alignment and spaced at predetermined intervals transversely of said hoisting band, said anchor fitting includes an elongated generally flat base means and a plurality of substantially identical band engaging means projecting from one side thereof shaped and spaced to interfit with the transversely spaced apertures through said hoisting band, and said hoisting band attachment means of said latch assembly comprises a plurality of substantially identical means projecting toward the inner jaw thereof from the outer jaw thereof spaced and shaped to interfit with the transversely spaced apertures through said hoisting band.

4. A spreader bar assembly comprising an elongated body, hoist attachment means slideable longitudinally of said body, adjustable positioning means mounted upon said body and engaging said hoist attachment means for selectively positioning said hoist attachment means, a plurality of means for selectively receiving anchor means in interfitting engagement with said spreader bar assembly, and locking means for securing said spreader bar assembly in interfitting engagement with cooperating anchor means.

5. A spreader bar assembly comprising an elongated hollow body, hoist attachment means slideably engaging said body for movement longitudinally thereof, adjustable positioning means rotatably mounted upon said body and threadably engaging said hoist attachment means, an elongated flanged portion extending lengthwise of and secured to said body provided with a plurality of spaced apertures for receiving anchor means in interfitting relationship with said flanged portion, and locking means for securing said flanged portion in an interfitted relationship with anchor means inserted therethrough.

6. A spreader bar assembly for use with at least two hoisting bands and cooperating latch assemblies and anchor fittings having apertured attachment means projecting therefrom, comprising a substantially elongated tubular body member slotted lengthwise thereof, an elongated externally threaded shaft disposed concentrically within said body member, adjustable shaft positioning means fixedly secured to the opposite ends of said shaft and arranged to restrain said shaft longitudinally relative to said body member, an annular internally threaded slide member disposed concentrically of and in threadable engagement with said shaft within said body member, an elongated web fixedly secured to and projecting radially from said annular slide member through said slotted body member, a pair of spaced parallel apertured hoisting ears fixedly secured to said web, a susbtantially elongated U-shaped member including spaced parallel first and second legs fixedly secured along the free edges thereof to said elongated body member, each said leg being provided with a series of spaced substantially identical apertures therethrough respectively aligned with the corresponding apertures in the other leg to receive the apertured attachment means of cooperating interfitted anchor fittings, and locking pins inserted between the respective legs of said elongated U-shaped member and through the apertured attachment means of interfitted anchor fittings.

7. Anchor means for use on a load supported by a hoisting band of the cincture type having aperture means, comprising: a base having a cylindrically concave major surface formed on one side for abutting a cylindrically convex surface of the load and tapered toward the opposite straight edges of the concave surface to provide compliance thereto, ear means formed on the opposite major surface of said base means for engaging the edges of the hoisting band and for limiting the angular displacement thereof, and boss means formed on the opposite major surface of said base means for interfitting with the aperture means terminating in parallel lugs, each of said lugs including aligned holes for inserting a pin; whereby the base plate may be interpositioned between the hoisting band and the load with the holes being accessible for pin insertion.

8. Anchor means for use on a load supported by a hoisting band of the cincture type having a single row of apertures spaced along its length, comprising: a base having a cylindrically concave major surface formed on one side for abutting a cylindrically convex surface of the load and tapered toward the opposite straight edges of the concave surface to provide compliance thereto, ear means formed on the opposite major surface of said base means for engaging the edges of the hoisting band and for limiting the angular displacement thereof, and a boss means formed on the opposite major surface of said base means for interfitting with the apertures and terminating in two parallel lugs, each of said lugs including aligned holes for inserting a pin; whereby the base plate may be interpositioned between the hoisting band and the load with the holes being accessible for pin insertion.

9. Latch means for securing a hoisting band of the cincture type having aperture means at each of its ends, comprising: a first jaw having boss means formed thereon for interfitting with the aperture means and for extending through the aperture means at one end of the band, a second jaw pivotally connected to said first jaw near one end of each on a first axis transverse to the longitudinal axis of the band when engaging said boss means, connecting means pivotally connected at one of its ends to said second jaw on a second axis displaced from and parallel to said first axis forming thereby over-center toggle action, anchor means having lug means formed thereon for interfitting with the aperture means and for extending through the aperture means at the other end of the band, and means for pivotally connecting the other end of said connecting member to the outer terminal of said lug means; whereby the band may be clamped about a load contained therein.

10. Latch means as set forth in claim 9 further comprising: recess means near the other end of said first jaw, locking means slidably connected to the other end of said second jaw registering with said recess means when in a clamping position, force-exerting means abutting said locking means for urging the same into said recess means in the clamping position, and actuator means operatively connected to said locking means for manually opposing said force-exerting means; whereby said jaws may be positively positioned relative to each other.

11. Latch means for securing a hoisting band of the cincture type having a single row of apertures spaced along its length, comprising: an outer jaw having a boss formed thereon for interfitting with the apertures and for extending through an aperture at one end of the band, an inner jaw pivotally connected to said outer jaw near one end of each on a first axis transverse to the longitudinal axis of the band when engaging said boss, connecting means pivotally connected at one of its ends to said inner jaw on a second axis displaced from and parallel to said first axis forming thereby over-center toggle action, anchor means having a lug formed thereon for interfitting with the apertures and for extending through another aperture at the other end of the band, and means for pivotally connecting the other end of said connecting member to the outer terminal of said lug; whereby the band may be cinched about a load contained therein.

12. Latch means as set forth in claim 11 further comprising: recess means near the other end of said outer jaw, locking means slidably connected to the other end of said inner jaw registering with said recess means when in a clamping position, force-exerting means abutting said locking means for urging the same into said recess means in the clamping position, and actuator means operatively connected to said locking means for manually opposing said force-exerting means; whereby said inner jaw may be positively positioned relative to said outer jaw.

13. A hoisting sling comprising, in combination: a hoisting band having aperture means spaced along its length, a first jaw having boss means formed thereon for interfitting with the aperture means and for extending through one of said aperture means of the band, a second jaw pivotally connected to said first jaw near one end of each on a first axis transverse to the longitudinal axis of said band, first means pivotally connected at one end to said second jaw on a second axis spaced from and parallel to said first axis forming thereby over-center toggle action, anchor means having lugs formed thereon for interfitting with the aperture means and extending through another of said aperture means of the band, second means pivotally connected between the other end of said first means and the outer terminal of said lugs; and means formed at the terminal end of said lugs for being operatively connected to a hoisting mechanism.

14. A device as described in claim 13 and in addition a double acting safety lock assembly fixedly secured to one said jaw of said latch assembly and positioned to engage the other said jaw of said latch assembly when said jaws are disposed in clamping relation to said hoisting band.

15. A double acting safety lock assembly for use in securing a latch assembly including hingedly interfitted inner and outer jaws respectively provided with spaced parallel flanges, comprising an elongated hollow cylindrical supporting member projecting through and fixedly secured to the respective flanges of the inner jaw of a latch assembly, first and second elongated locking means disposed within and projecting from the opposite ends of said supporting member adapted to engage the respective flanges of the outer jaw of a latch assembly, a double acting biasing means disposed within said supporting member and arranged to act on both of said locking means, first and second actuator means connected to said first and second locking means and projecting through said supporting member for manual manipulation of said actuator means, said first and second locking means comprising elongated pins each having a longitudinally extending slot at the end thereof adjacent to said biasing means and provided with a pin member extending transversely of the slot therethrough, said first and second actuator means comprising elongated levers each slotted at one end for engagement with one of said pin members and shaped at the other end for manual manipulation thereof, and fixedly supported pivot means pivotally interconnecting said levers intermediate the ends thereof.

16. A double acting safety lock assembly for use in securing a latch assembly including inner and outer jaws hingedly interfitted so that a pair of spaced parallel flanges on said inner jaw pass between a pair of spaced parallel flanges on said outer jaw each provided with an apertured locking ear projecting therefrom, said safety lock assembly comprising an elongated hollow cylindrical supporting member projecting through and fixedly secured to the respective flanges of the inner jaw of a latch assembly, first and second elongated locking means disposed within and projecting from the opposite ends of said supporting member and adapted to engage the apertured locking ears projecting from the respective flanges of the outer jaw of a latch assembly, a double acting biasing means disposed within said supporting member and arranged to act on both of said locking means, first and second actuator means connected to said first and second locking means and projecting through said supporting member for manual manipulation of said actuator means, each said actuator means including first and second opposed arms projecting oppositely from each said locking means, first and second elongated extension members respectively supported at the extremities of said arms and extending beyond the end of said locking means, and a cross member interconnecting the extremities of the respective extension members and spaced from the end of said locking means and adapted to encircle the respective locking ears projecting from the flanges of the outer jaw of a latch assembly, and restraining means mounted upon the opposite ends of said supporting member and arranged to engage the arms of said actuator means and thereby limit the displacement of said locking means relative to said supporting member.

References Cited in the file of this patent

UNITED STATES PATENTS

| | | |
|---|---|---|
| 530,862 | Teed | Dec. 11, 1894 |
| 680,370 | Bergman et al. | Aug. 13, 1901 |
| 1,787,150 | Gerow et al. | Dec. 30, 1930 |
| 1,903,863 | Hayden | Apr. 18, 1933 |
| 2,289,422 | Grotnes | July 14, 1942 |

(Other references on following page)

UNITED STATES PATENTS

| | | |
|---|---|---|
| 2,381,349 | Hagen et al. | Aug. 7, 1945 |
| 2,393,105 | Hasselhorn | Jan. 15, 1946 |
| 2,412,488 | Austin | Dec. 10, 1946 |
| 2,433,523 | Mahan et al. | Dec. 30, 1947 |
| 2,462,744 | Hasselhorn | Feb. 22, 1949 |
| 2,506,564 | Blanchard | May 9, 1950 |
| 2,826,119 | Barrowman | Mar. 11, 1958 |
| 2,831,720 | Renfroe | Apr. 22, 1958 |
| 2,852,827 | Arnold | Sept. 23, 1958 |
| 2,870,509 | Gaylord | Jan. 27, 1959 |
| 2,948,939 | Prete | Aug. 16, 1960 |

FOREIGN PATENTS

| | | |
|---|---|---|
| 496,403 | France | Aug. 2, 1919 |
| 1,113,322 | France | Dec. 5, 1955 |
| 429,079 | Germany | May 18, 1926 |
| 236,575 | Great Britain | Dec. 17, 1925 |
| 264,551 | Italy | Mar. 1, 1929 |
| 269,817 | Italy | Mar. 31, 1928 |
| 111,735 | Sweden | Sept. 5, 1944 |